US012810875B2

(12) United States Patent
Ou et al.

(10) Patent No.: US 12,810,875 B2
(45) Date of Patent: Nov. 24, 2026

(54) AUDIO COMPRESSION METHOD, AUDIO COMPRESSION DEVICE AND NON-TRANSITORY COMPUTER READABLE STORAGE MEDIUM

(71) Applicant: Realtek Semiconductor Corporation, Hsinchu (TW)

(72) Inventors: Hsin-Ying Ou, Hsinchu (TW); Pao-Ting Chou, Hsinchu (TW); Chia-Wei Yu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 127 days.

(21) Appl. No.: 19/059,284

(22) Filed: Feb. 21, 2025

(65) Prior Publication Data

US 2026/0057893 A1 Feb. 26, 2026

(30) Foreign Application Priority Data

Aug. 23, 2024 (TW) ................................ 113131911

(51) Int. Cl.
*G10L 19/008* (2013.01)
*G10L 19/00* (2013.01)

(52) U.S. Cl.
CPC ........ *G10L 19/008* (2013.01); *G10L 19/0017* (2013.01)

(58) Field of Classification Search
CPC .... G10L 19/008; G10L 19/0017; G10L 19/22
See application file for complete search history.

(56) References Cited

U.S. PATENT DOCUMENTS

| | | | | |
|---|---|---|---|---|
| 7,424,434 B2 * | 9/2008 | Chen | ........................ | G10L 19/06 704/E19.044 |
| 2003/0115052 A1 | 6/2003 | Chen et al. | | |
| 2007/0185706 A1 | 8/2007 | Chen et al. | | |

FOREIGN PATENT DOCUMENTS

| | | | | | |
|---|---|---|---|---|---|
| CN | 110265043 B | * | 6/2021 | ............. | G10L 19/04 |
| EP | 0734174 B1 | * | 8/2007 | ............. | H04N 19/50 |
| EP | 4383707 A1 | * | 6/2024 | ............. | H04N 19/46 |

* cited by examiner

*Primary Examiner* — Daniel C Washburn
*Assistant Examiner* — Penny L Caudle
(74) *Attorney, Agent, or Firm* — CKC & Partners Co., LLC

(57) ABSTRACT

An audio compression method, comprising: dividing an audio signal into at least one block signal, wherein each of the at least one block signal comprises a plurality of channel signals and has a block data size; performing a lossless compression on one of the at least one block signal; in response to the block data size of the compressed one of the at least one block signal being equal to or smaller than a budget data size, outputting the compressed audio signal; in response to the block data size of the compressed one of the at least one block signal being greater than the budget data size, performing a lossy compression on at least one of the plurality of channel signals based on a scale factor; and in response to all of the plurality of channel signals having been compressed based on the scale factor, reducing the scale factor.

20 Claims, 4 Drawing Sheets

AUDIO COMPRESSION METHOD, AUDIO COMPRESSION DEVICE AND NON-TRANSITORY COMPUTER READABLE STORAGE MEDIUM

RELATED APPLICATIONS

This application claims priority to Taiwan Application Serial Number 113131911, filed on Aug. 23, 2024, which is herein incorporated by reference in its entirety.

BACKGROUND

Technical Field

The present disclosure relates to an audio compression technology. More particularly, the present disclosure relates to an audio compression method, an audio compression device and a non-transitory computer readable storage medium that combine lossless compression and lossy compression.

Description of Related Art

In today's audio signal compression technology, audio compression is usually carried out by choosing between lossy compression and lossless compression. Since the compression rate of lossless compression has a limit, when the compression rate of lossless compression cannot meet the demand, lossy compression that can achieve a higher compression rate will be selected to compress the audio.

However, lossy compression often compresses by discarding part of the bits of the audio signal, resulting in more audio data loss and lowering the audio quality. Therefore, how to improve the compression rate without significantly reducing the audio quality is one of the topics in this field.

SUMMARY

An audio compression method is provided in the present disclosure. The audio compression method comprises: dividing, by a processor, an audio signal into at least one block signal, wherein each of the at least one block signal comprises a plurality of channel signals and has a block data size; performing, by the processor, a lossless compression on one of the at least one block signal; in response to the block data size of the compressed one of the at least one block signal being equal to or smaller than a budget data size, outputting, by the processor, the audio signal being compressed; in response to the block data size of the compressed one of the at least one block signal being greater than the budget data size, performing, by the processor, a lossy compression on at least one of the plurality of channel signals based on a scale factor; and in response to all of the plurality of channel signals being compressed based on the scale factor, reducing, by the processor, the scale factor.

An audio compression device is provided in the present disclosure. The audio compression device is configured to compress and output an audio signal, and comprises a processor and a storage device. The processor is configured to receive the audio signal, divide the audio signal into at least one block signal, and perform a lossless compression on one of the at least one block signal. The storage device is coupled to the processor and configured to store a scale factor and a budget data size. Each of the at least one block signal comprises a plurality of channel signals and has a block data size. When the block data size of the compressed one of the at least one block signal is equal to or smaller than a budget data size, the processor is configured to out the audio signal being compressed. When the block data size of the compressed one of the at least one block signal is greater than the budget data size, the processor is configured to read the scale factor from the storage device and perform a lossy compression on at least one of the plurality of channel signals based on the scale factor. When all of the plurality of channel signals have been compressed based on the scale factor, the processor is configured to reduce the scale factor and transmit the reduced scale factor back to the storage device.

A non-transitory computer readable storage medium is provided in the present disclosure. The non-transitory computer readable storage medium is configured to store a plurality of computer readable instructions. When the plurality of computer readable instructions are executed for compressing an audio signal by one or a plurality of processors, the one or the plurality of processors is configured to perform the following operations: dividing an audio signal into at least one block signal, wherein each of the at least one block signal comprises a plurality of channel signals and has a block data size; performing a lossless compression on one of the at least one block signal; in response to the block data size of the compressed one of the at least one block signal being equal to or smaller than a budget data size, outputting the audio signal being compressed; in response to the block data size of the compressed one of the at least one block signal being greater than the budget data size, performing a lossy compression on at least one of the plurality of channel signals based on a scale factor; and in response to all of the plurality of channel signals having been compressed based on the scale factor, reducing the scale factor.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
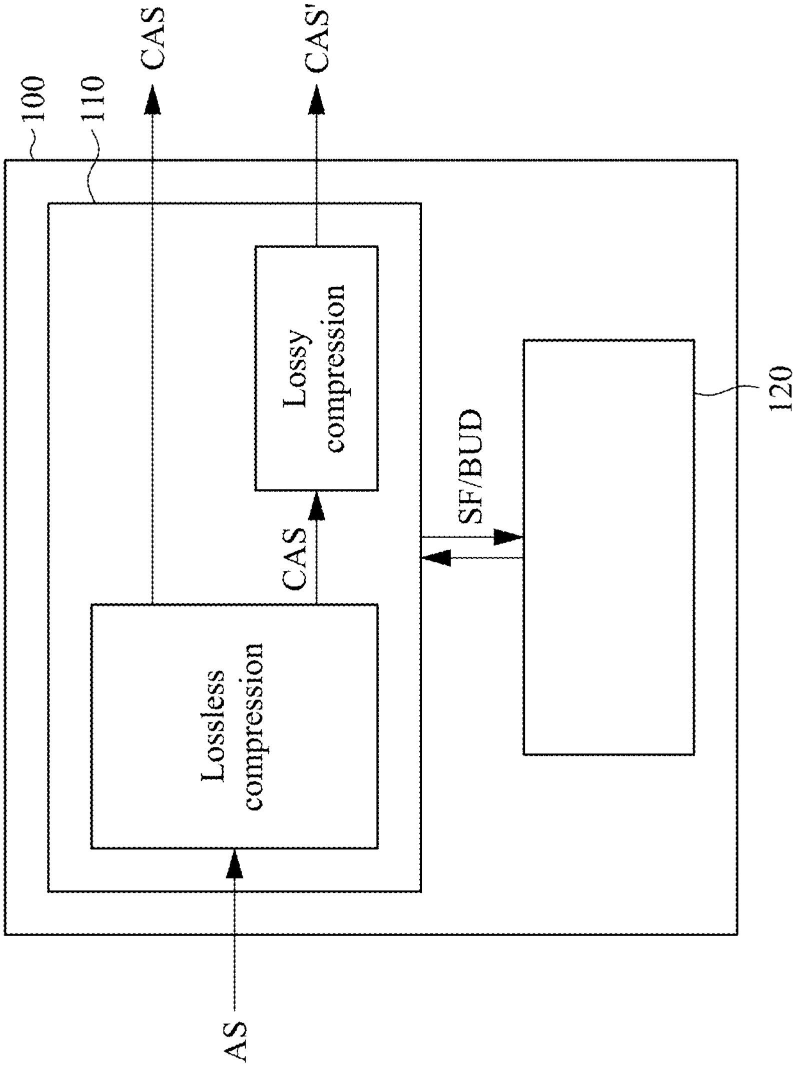
FIG. 1 is a functional block diagram of an audio compression device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the present disclosure, when an element is referred to as "connected", it may mean "electrically connected" or "optical connected". When an element is referred to as "coupled", it may mean "electrically coupled" or "optical coupled". "Connected" or "coupled" can also be used to indicate that two or more components operate or interact with each other. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

FIG. 1 is a functional block diagram of an audio compression device 100 in accordance with some embodiments of the present disclosure. In some embodiments, the audio compression device 100 comprises a processor 110 and a storage device 120, and is configured to receive an audio signal AS and output compressed audio signals CAS and CAS'. In some embodiments not shown, the processor 110 may comprises a plurality of processors 110 to process a plurality of audio signals AS simultaneously.

The processor 110 is coupled to the storage 120, and is configured to receive the audio signal AS and perform a lossless compression on the audio signal AS based on related factors (e.g., a scale factor SF, a budget data size BUD, a scale lower limit, etc. stored in the storage device 120), so as to generate the compressed audio signal CAS. Under some specific conditions (which will be described in detail in subsequent paragraphs), the processor 110 is further configured to perform a lossy compression on the lossless-compressed audio signal CAS, so as to generate the compressed audio signal CAS'.

In some embodiments, the processor 110 can be implemented with a central processing unit (CPU), an application specific integrated circuit (ASIC), other devices with processing functions or any combination of the above.

The storage device 120 is coupled to the processor 110, and is configured to store related factors used in lossless compression and lossy compression, such as the scale factor SF, the budget data size BUD, the scale lower limit, etc. (which will be described in detail in subsequent paragraphs). In some embodiments, In some embodiments, the storage device 120 can be implemented with a random access memory (RAM), a read-only memory (ROM), a flash memory, a hard disk, other devices with storage functions or any combination of the above.

Figure 2:
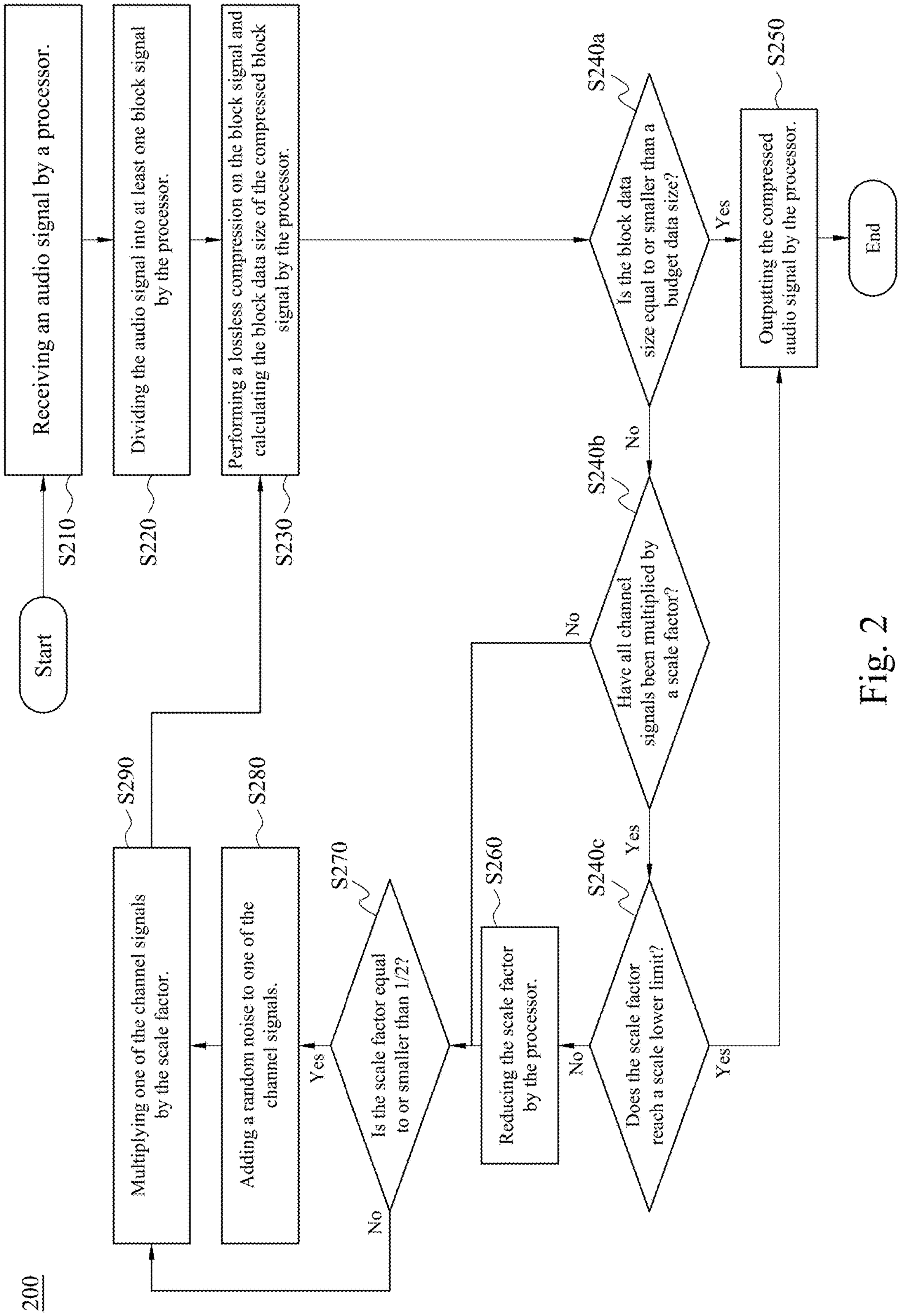
FIG. 2 is a flowchart of an audio compression method in accordance with some embodiments of the present disclosure.

FIG. 2 is a flowchart of an audio compression method 200 in accordance with some embodiments of the present disclosure. In some embodiments, the audio compression method 200 comprises steps S210, S220, S230, S240*a*, S240*b*, S240*c*, S250, S260, S270, S280 and S290.

In step S210, a processor (e.g., the processor 110 of FIG. 1) receives an audio signal AS. Next, step S220 will be performed.

Figure 3A:
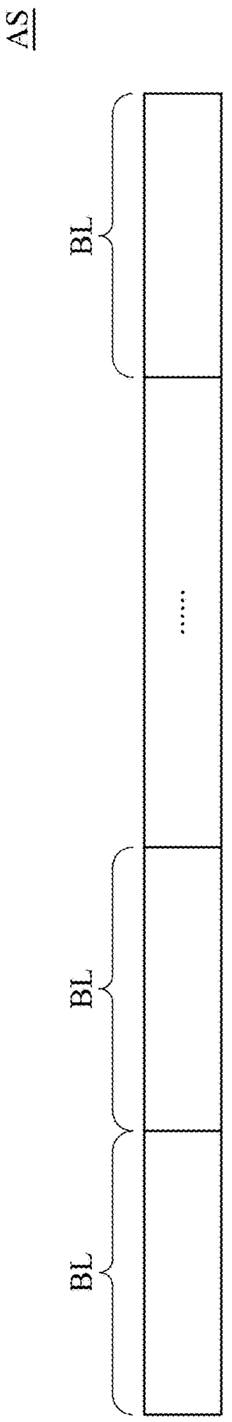
FIG. 3A is a schematic diagram of block signals in an audio signal in accordance with some embodiments of the present disclosure.

In step S220, the processor 110 divides the audio signal AS into at least one block signal BL. For the detailed description of the block signal BL, please refer to FIG. 3A and FIG. 3B. FIG. 3A is a schematic diagram of the block signals BL in the audio signal AS in accordance with some embodiments of the present disclosure.

In some embodiments, the audio signal AS may be divided into a plurality of block signals BL, and these block signals BL have the same block data size. Taking the embodiment of FIG. 3A as an example, the block signals BL in the audio signal AS are shown as a plurality of blocks with the same size, so as to represent that they have the same block data size. In some embodiments, the audio signal AS may comprise only one block signal BL (e.g., the embodiment of FIG. 3B).

Figure 3B:
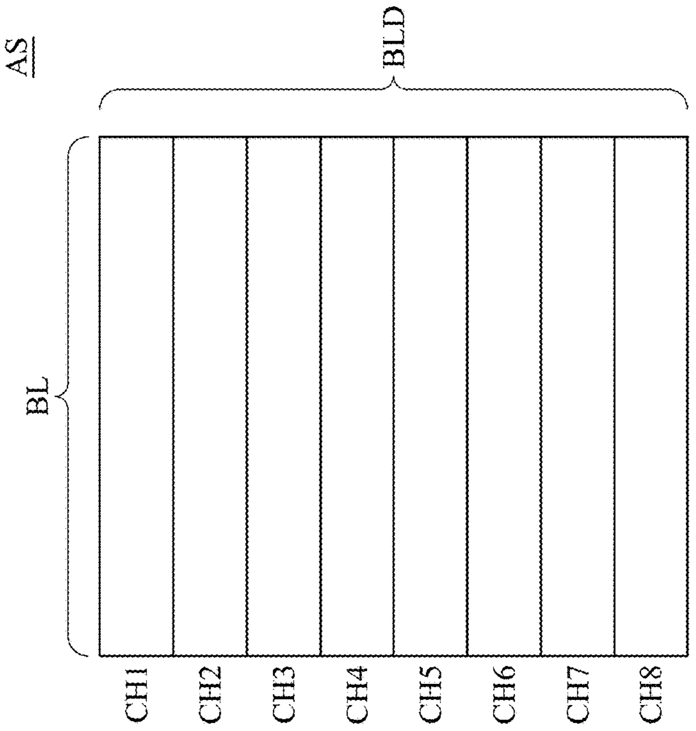
FIG. 3B is a schematic diagram of channel signals of an audio signal in accordance with some embodiments of the present disclosure.

FIG. 3B is a schematic diagram of channel signals CH1-CH8 of the audio signal AS in accordance with some embodiments of the present disclosure. In the embodiment of FIG. 3B, the audio signal AS comprises eight channels, so that the block signal BL comprises channel signals CH1-CH8. In some embodiments, the sum of the data sizes of the channel signals CH1-CH8 is equal to the block data size BLD of the block signal BL.

It should be noted that the numbers of the block signals BL and the channel signals in FIG. 3A and FIG. 3B are only examples, and are not intended to limit the present disclosure. The audio signals AS with other numbers of the block signals BL and the channel signals are within the scope of the present disclosure.

Please refer to FIG. 2 again. After step S220 is finished, step S230 will be performed. In step S230, the processor 110 performs a lossless compression on the block signal BL and calculates the block data size BLD of the compressed block signal BL. Person having ordinary skill in the art should understand the lossless compression described in the present disclosure. For the sake of brevity, the detail will not be repeated herein.

After step S230 is finished, step S240*a* will be performed. In step S240*a*, the processor 110 determines whether the block data size BLD of the compressed block signal BL is equal to or smaller than a budget data size BUD. When the block data size BLD is equal to or smaller than the budget data size BUD, step S250 will be performed; when the block data size BLD is greater than the budget data size BUD, step S240*b* will be performed. In some embodiments, the block data size BLD can be stored in a storage device (e.g., the storage device 120 of FIG. 1), so as to be read by the processor 110 in step S240*a*.

In step S240*b*, the processor 110 determines that the block data size BLD of the compressed block signal BL is not small enough, and it is necessary to further perform lossy compression on at least one channel signal in the block signal BL based on a scale factor SF. At this time, the processor 110 will determine whether all channel signals in the block signal BL have been lossy-compressed based on the current scale factor SF. When all channel signals in the block signal BL have been lossy-compressed based on the current scale factor SF, step S240*c* will be performed; when at least one channel signal in the block signal BL have not been lossy-compressed based on the current scale factor SF, step S270 will be performed.

Specifically, in some embodiments, the lossy compression described in the present disclosure represents sequentially multiplying the amplitudes of the plurality of channel signals of the block signal BL (e.g., selecting the channel signal CH1 for the first lossy compression, selecting the channel signal CH2 for the second lossy compression, and so on) by the scale factor SF, wherein the scale factor SF is greater than 0 and less than 1.

In step S240*c*, the processor 110 determines that although all channel signals in the block signal BL have been lossy-compressed based on the current scale factor SF, the block data size BLD is still not small enough. Therefore, the processor 110 will determine whether to reduce the scale factor SF. When the scale factor have reached a scale lower limit (e.g. one-eighth), it means that the scale factor SF has reached a critical value at which the audio signal CAS' will not be distorted, and thus step S250 will be performed at this time; when the scale factor is greater than the scale lower limit, it means that the scale factor SF can still be reduced, and thus step S260 will be performed at this time. In some embodiments, the scale lower limit is greater than 0 and less than 1.

In step S250, the processor 110 determines that the block data size BLD of the compressed block signal BL is small enough, so the processor 110 will output the compressed audio signal CAS; or, the processor 110 determines that the scale factor SF has reached the scale lower limit, and performing lossy compression with a lower scale factor SF will distort the output audio signal CAS', so the processor 110 will output the audio signal CAS' lossy-compressed based on the scale lower limit.

In some embodiments, the scale factor SF and the scale lower limit can be stored in a storage device (e.g., the storage device 120 of FIG. 1), so as to be read by the processor 110 in steps S240*b* and S240*c*. In some embodiments, the starting value of the scale factor SF and the value of the scale lower limit can be set by the processor 110 and be returned to the storage device 120 for storage.

In step S260, the processor 110 determines that the scale factor SF can still be reduced, so the processor 110 will reduce the scale factor SF. Next, step S270 will be performed.

As mentioned above, the lossy compression described in the present disclosure represents sequentially multiplying the amplitudes of the plurality of channel signals of the block signal BL by the scale factor SF. In other words, if the scale factor SF is too small, the amplitude of the lossy-compressed channel signal will also become too small, thereby causing quantization errors and affecting the quality of the output audio signal. In order to avoid the above situation, in step S270, the processor 110 determines whether the scale factor SF is equal to or smaller than one-half. When the scale factor SF is equal to or smaller than one-half, step S280 will be performed; when the scale factor SF is greater than one-half to the power of all positive integers N (i.e., the scale factor SF is greater than one-half), step S290 will be performed.

In step S280, the processor 110 adds a random noise to the amplitude of one of the plurality of channel signals that has not been lossy-compressed based on current scale factor SF. In some embodiments, the random noises added to each channel signal are not totally the same. When the scale factor SF is less than or equal to one-half to the power of N (wherein N is a positive integer) and greater than one-half to the power of (N+1), these random noises are between 0 and 2 to the power of N minus 1.

For example, when N is 1 and the scale factor SF is between one-quarter and one-half, the processor 110 will add a random noise between 0 and 1 to the channel signal CH1 based on this scale factor SF for the first lossy compression, add another random noise between 0 and 1 to the channel signal CH2 based on this scale factor SF for the second lossy compression, and so on.

Through the above-mentioned operation of adding random noises to the channel signals, when the amplitudes of the channel signals are reduced in subsequent operations, the quantization error caused by the reduction process can be reduced, thereby avoiding a significant impact on the quality of the output audio signal.

In step S290, the processor 110 performs lossy compression on one of the plurality of channel signals that has not been lossy-compressed based on current scale factor SF (i.e., as mentioned above, multiplying the amplitude by the scale factor SF), and then step S230 will be performed. For example, when step S290 is performed for the first time, the processor 110 selects the channel signal CH1 to perform lossy compression. If the block data size BLD of the compressed block signal BL is still greater than the budget data size BUD, step S290 will be performed again, and the processor 110 will select the channel signal CH2 to perform lossy compression at this time, and so on.

It should be understood that the number and order of the steps of the audio compression method 200 are only examples, and are not intended to limit the present disclosure. Other numbers and orders of the steps are within the scope of the present disclosure. In some embodiments, steps S270 and S280 can be omitted, and step S290 is performed after step S260 at this situation.

Figure 4:
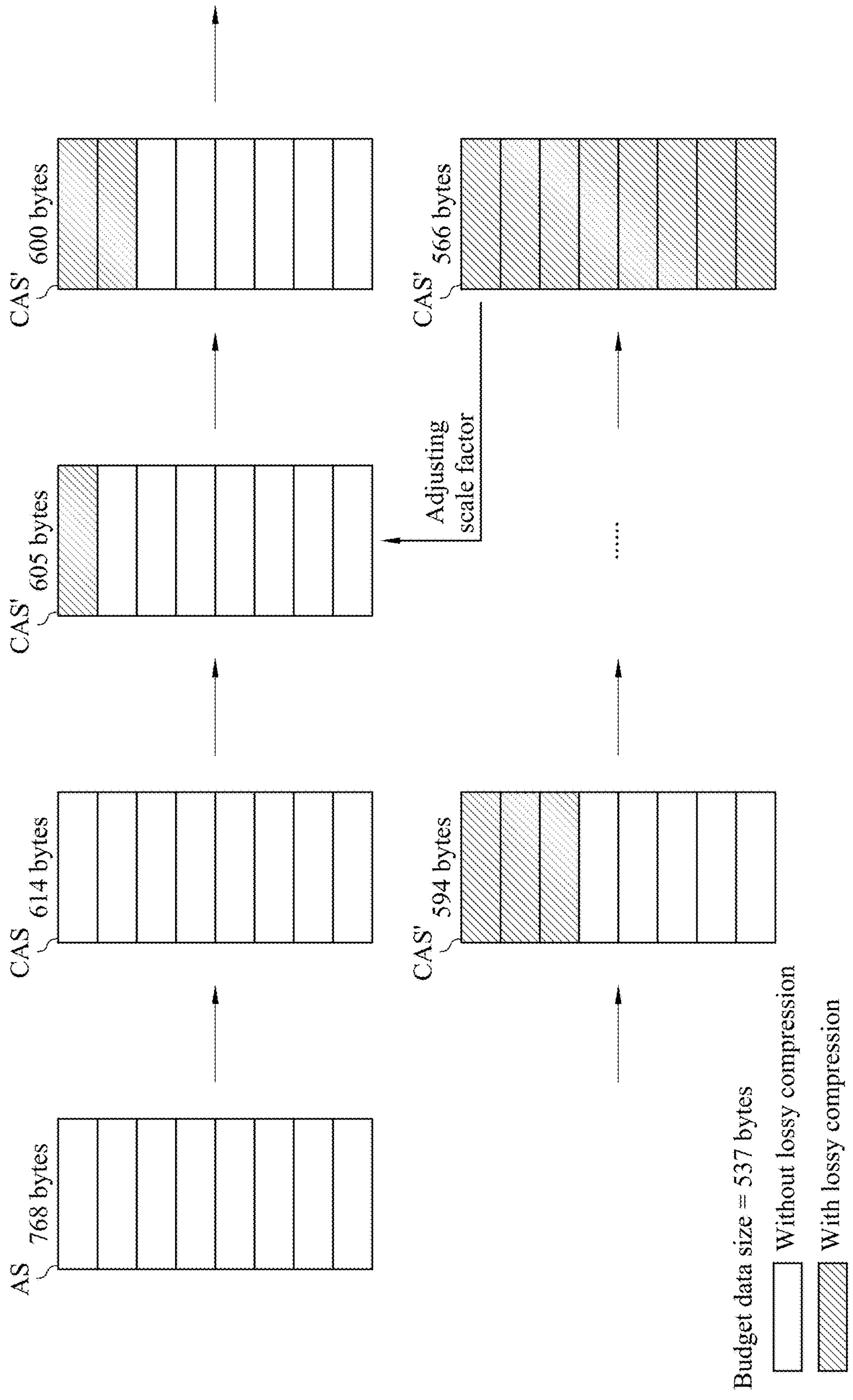
FIG. 4 is a schematic diagram of performing a lossless compression and a lossy compression on an audio signal in accordance with some embodiments of the present disclosure.

In order to make the audio compression method 200 of the present disclosure be understood in more detailed, please refer to FIG. 4. FIG. 4 is a schematic diagram of performing a lossless compression and a lossy compression on the audio signal AS in accordance with some embodiments of the present disclosure. It should be noted that for the sake of simplicity of the figure, the labels for the block signal BL and the channel signals CH1-CH8 in the audio signals AS, CAS and CAS' are omitted in FIG. 4, and the lossy-compressed channel signals are shown as blocks with slashed lines. In addition, for the sake of simplicity of the figure, the audio signals AS, CAS and CAS' in FIG. 4 are shown as comprising only one block signal BL, and thus the data sizes of the audio signals AS, CAS and CAS' are equal to the data size of the block signal BL.

In the embodiment of FIG. 4, the budget data size BUD is set to 537 bytes. In the process of the audio compression method 200, the data size of the audio signal AS (obtained through step S210) is 768 bytes, and the data size of the lossless-compressed audio signal CAS (obtained through step S230) is 614 bytes. Since the data size of the lossless-compressed audio signal CAS is greater than the budget data size BUD, the audio signal CAS will be further lossy-compressed.

In the first lossy compression (i.e., step S290), the amplitude of the channel signal CH1 is multiplied by the scale factor SF. Next, the lossy-compressed audio signal CAS' will be lossy-compressed again and the data size of the same will be calculated again (i.e., step S230 is performed again). It should be noted that random noises may be added to the amplitudes of the channel signals before each multiplication by the scale factor SF (i.e., step S280), for the sake of brevity, the detail will not be repeated herein.

As shown in FIG. 4, the data size of the audio signal CAS' after the first lossy compression is 605 bytes, which is still greater than the budget data size BUD, so the audio signal CAS' will be lossy-compressed again.

In the second lossy compression (i.e., step S290 for the second time), the amplitude of the channel signal CH2 is multiplied by the scale factor SF. Next, the lossy-compressed audio signal CAS' will be lossy-compressed again and the data size of the same will be calculated again (i.e., step S230 is performed again). As shown in FIG. 4, the data size of the audio signal CAS' after the second lossy compression is 600 bytes, which is still greater than the budget data size BUD, so the audio signal CAS' will be lossy-compressed again.

After the audio signal CAS has been lossy-compressed for eight times (corresponding to the eight channels), if the data size of the audio signal CAS' (e.g., 566 bytes shown in FIG. 4) is still greater than the budget data size BUD and the scale factor SF has not reached the scale lower limit, the scale factor SF will be reduced. Next, the processor 110 will sequentially lossy-compress the channel signals CH1-CH8 again based on the reduced scale factor SF, until the data size of the compressed audio signal CAS' is equal to or smaller than the budget data size BUD, and then output the audio signal CAS', or directly output the audio signal CAS' when the scale factor SF reaches the scale lower limit.

In some embodiments, the processor 110 does not lossy-compress the channel signals CH1-CH8 in sequence, but selects one of the channel signals CH1-CH8 that has not been lossy-compressed to compress in every lossy compression.

The present disclosure provides a non-transitory computer readable storage medium storing a plurality of computer readable instructions, when the plurality of computer readable instructions are executed by one or a plurality of processors (e.g., the processor 110 of FIG. 1), the one or the plurality of processors is configured to perform the steps S210, S220, S230, S240*a*, S240*b*, S240*c*, S250, S260, S270, S280 and S290 of the audio compression method 200 described above.

With the audio compression method 200, the audio compression device 100 and the non-transitory computer readable storage medium provided in the present disclosure, the audio compression can be carried out by a combination of lossless compression and lossy compression. In addition, the lossy compression performed based on the scale factor SF, the random noise and the budget data size BUD that is provided in the present disclosure can reduce the impact of quantization error on the quality of the output audio signals, thereby achieving an increasing in the compression rate while reducing data loss.

The above are preferred embodiments of the present disclosure. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An audio compression method, comprising:

dividing, by a processor, an audio signal into at least one block signal, wherein each of the at least one block signal comprises a plurality of channel signals and has a block data size;

performing, by the processor, a lossless compression on one of the at least one block signal;

in response to the block data size of the compressed one of the at least one block signal being equal to or smaller than a budget data size, outputting, by the processor, the audio signal being compressed;

in response to the block data size of the compressed one of the at least one block signal being greater than the budget data size, performing, by the processor, a lossy compression on at least one of the plurality of channel signals based on a scale factor; and in response to all of the plurality of channel signals having been compressed based on the scale factor, reducing, by the processor, the scale factor.

2. The audio compression method of claim 1, wherein performing, by the processor, the lossy compression on the at least one of the plurality of channel signals based on the scale factor comprises:

multiplying, by the processor, an amplitude of one of the plurality of channel signals by the scale factor; and in response to the block data size of the lossy-compressed one of the at least one block signal being greater than the budget data size, multiplying, by the processor, an amplitude of another one of the plurality of channel signals by the scale factor.

3. The audio compression method of claim 2, wherein the scale factor is greater than 0 and less than 1.

4. The audio compression method of claim 3, further comprising:

in response to the block data size of the compressed one of the at least one block signal being greater than the budget data size and the scale factor being equal to a scale lower limit, outputting, by the processor, the audio signal being compressed, wherein the scale lower limit is greater than 0 and less than 1.

5. The audio compression method of claim 3, wherein performing, by the processor, the lossy compression on the at least one of the plurality of channel signals based on the scale factor comprises:

in response to the scale factor being less than or equal to one-half to the power of N and greater than one-half to the power of (N+1), adding, by the processor, a random noise to the amplitude of the one of the plurality of channel signals, wherein N is a positive integer.

6. The audio compression method of claim 5, wherein the random noise is between 0 and 2 to the power of N minus 1.

7. The audio compression method of claim 1, wherein the audio signal is divided into a plurality of block signals, and the block data sizes of the plurality of block signals are the same as each other.

8. An audio compression device configured to compress and output an audio signal, comprising:

a processor, configured to receive the audio signal, divide the audio signal into at least one block signal, and perform a lossless compression on one of the at least one block signal; and a storage device, coupled to the processor and configured to store a scale factor and a budget data size, wherein each of the at least one block signal comprises a plurality of channel signals and has a block data size, when the block data size of the compressed one of the at least one block signal is equal to or smaller than a budget data size, the processor is configured to out the audio signal being compressed, when the block data size of the compressed one of the at least one block signal is greater than the budget data size, the processor is configured to read the scale factor from the storage device and perform a lossy compression on at least one of the plurality of channel signals based on the scale factor, and when all of the plurality of channel signals have been compressed based on the scale factor, the processor is configured to reduce the scale factor and transmit the reduced scale factor back to the storage device.

9. The audio compression device of claim 8, wherein the operation of the processor performing the lossy compression on the at least one of the plurality of channel signals based on the scale factor comprises:

the processor multiplies an amplitude of one of the plurality of channel signals by the scale factor, wherein when the block data size of the lossy-compressed one of the at least one block signal is greater than the budget data size, the processor is further configured to multiply an amplitude of another one of the plurality of channel signals by the scale factor.

10. The audio compression device of claim 9, wherein the scale factor is greater than 0 and less than 1.

11. The audio compression device of claim 10, wherein when the processor has compressed the plurality of channel signals based on the scale factor and the scale factor is equal to a scale lower limit, the processor is further configured to output the audio signal being compressed, wherein the scale lower limit is greater than 0 and less than 1, and the storage device is further configured to store the scale lower limit.

12. The audio compression device of claim 10, wherein the operation of the processor performing the lossy compression on the at least one of the plurality of channel signals based on the scale factor comprises:

when the scale factor is less than or equal to one-half to the power of N and greater than one-half to the power of (N+1), the processor is further configured to add a random noise to the amplitude of the one of the plurality of channel signals, wherein N is a positive integer.

13. The audio compression device of claim 12, wherein the random noise is between 0 and 2 to the power of N minus 1.

14. The audio compression device of claim 8, wherein the processor is further configured to divide the audio signal into a plurality of block signals, and the block data sizes of the plurality of block signals are the same as each other.

15. A non-transitory computer readable storage medium, storing a plurality of computer readable instructions, when the plurality of computer readable instructions are executed for compressing an audio signal by one or a plurality of processors, the one or the plurality of processors is configured to perform the following operations:

dividing an audio signal into at least one block signal, wherein each of the at least one block signal comprises a plurality of channel signals and has a block data size;

performing a lossless compression on one of the at least one block signal;

in response to the block data size of the compressed one of the at least one block signal being equal to or smaller than a budget data size, outputting the audio signal being compressed;

in response to the block data size of the compressed one of the at least one block signal being greater than the budget data size, performing a lossy compression on at least one of the plurality of channel signals based on a scale factor; and in response to all of the plurality of channel signals having been compressed based on the scale factor, reducing the scale factor.

16. The non-transitory computer readable storage medium of claim 15, wherein the operation of performing the lossy compression on the at least one of the plurality of channel signals based on the scale factor comprises:

multiplying an amplitude of one of the plurality of channel signals by the scale factor; and in response to the block data size of the lossy-compressed one of the at least one block signal being greater than the budget data size, multiplying an amplitude of another one of the plurality of channel signals by the scale factor, wherein the scale factor is greater than 0 and less than 1.

17. The non-transitory computer readable storage medium of claim 16, wherein the one or the plurality of processors is further configured to perform the following operations:

in response to the block data size of the compressed one of the at least one block signal being greater than the budget data size and the scale factor being equal to a scale lower limit, outputting the audio signal being compressed, wherein the scale lower limit is greater than 0 and less than 1.

18. The non-transitory computer readable storage medium of claim 16, wherein the operation of performing the lossy compression on the at least one of the plurality of channel signals based on the scale factor comprises:

in response to the scale factor being less than or equal to one-half to the power of N and greater than one-half to the power of (N+1), adding a random noise to the amplitude of the one of the plurality of channel signals, wherein N is a positive integer.

19. The non-transitory computer readable storage medium of claim 18, wherein the random noise is between 0 and 2 to the power of N minus 1.

20. The non-transitory computer readable storage medium of claim 15, wherein the audio signal is divided into a plurality of block signals, and the block data sizes of the plurality of block signals are the same as each other.

* * * * *